United States Patent [19]

Graham et al.

[11] Patent Number: 4,714,728

[45] Date of Patent: Dec. 22, 1987

[54] AQUEOUS DISPERSIONS OF ACIDIC ETHYLENE INTERPOLYMERS

[75] Inventors: Stephen L. Graham, Houston; David O. Plunkett, Lake Jackson, both of Tex.

[73] Assignee: The Dow Chemical Company, Midland, Mich.

[21] Appl. No.: 887,846

[22] Filed: Jul. 18, 1986

[51] Int. Cl.$^4$ ............................ C08F 2/16; C08F 8/00; C08F 8/30

[52] U.S. Cl. .................................. 524/272; 524/460; 524/833; 525/326.1; 525/327.8; 525/329.5; 525/329.7; 525/329.9; 525/330.2; 525/54.44; 525/54.45; 525/192

[58] Field of Search ........................ 524/272, 460, 833; 525/326.1, 327.8, 329.5, 329.7, 329.9, 330.2, 54.44, 54.45, 192

[56] References Cited

U.S. PATENT DOCUMENTS

| | | | |
|---|---|---|---|
| 3,401,134 | 9/1968 | Fantl et al. | 524/832 |
| 3,448,178 | 6/1969 | Flanagan | 525/149 |
| 3,485,783 | 12/1969 | Kehe | 524/272 |
| 3,487,036 | 12/1969 | Bissot | 524/272 |
| 3,620,878 | 11/1971 | Guthrie | 156/309 |
| 3,674,896 | 7/1972 | Purcell et al. | 525/329.9 |
| 3,677,985 | 7/1972 | Sirota et al. | 524/272 |
| 3,823,108 | 7/1974 | Bissot | 524/272 |
| 3,853,606 | 12/1974 | Parkinson | 117/128 |
| 3,869,416 | 3/1975 | Hoh | 524/272 |
| 3,904,569 | 9/1975 | Hekal | 523/100 |
| 3,912,674 | 10/1975 | Stahl | 524/272 |
| 3,919,176 | 11/1975 | Meyer | 525/285 |
| 3,966,654 | 6/1976 | Aldrich | 524/270 |
| 4,018,732 | 4/1977 | Lakshmanan | 524/270 |
| 4,132,690 | 1/1979 | Eernstman et al. | 524/270 |
| 4,169,116 | 9/1979 | Trotter et al. | 525/210 |
| 4,189,419 | 2/1980 | Takemoto et al. | 524/272 |
| 4,252,858 | 2/1981 | Chao et al. | 428/421 |
| 4,283,317 | 8/1981 | Murphy et al. | 524/272 |
| 4,284,541 | 8/1981 | Takeda et al. | 524/272 |
| 4,284,542 | 8/1981 | Boyce et al. | 524/140 |
| 4,289,669 | 9/1981 | Lakshmanan | 524/272 |
| 4,324,871 | 4/1982 | Acharya et al. | 525/149 |
| 4,325,853 | 4/1982 | Acharya et al. | 524/272 |
| 4,328,141 | 5/1982 | Farewell et al. | 524/272 |
| 4,359,552 | 11/1982 | Acharya et al. | 525/193 |
| 4,367,113 | 1/1983 | Karim et al. | 156/327 |
| 4,438,232 | 3/1984 | Lee | 524/272 |
| 4,654,389 | 3/1987 | Graham et al. | 524/272 |

FOREIGN PATENT DOCUMENTS 58057769 9/1980 Japan .
58080370 11/1981 Japan .

OTHER PUBLICATIONS

Kirk-Othmer Encyclopedia of Chemical Technology, 2d ed., vol. 17, pp. 478-5098 (1968).
Dow sales literature, published Aug. 1983, "Ethylene-Acrylic Acid Copolymers for Specialty Hot Melt Adhesives".

Primary Examiner—Harold D. Anderson
Assistant Examiner—Dennis R. Daley
Attorney, Agent, or Firm—Daniel N. Lundeen; Walter J. Lee

[57] ABSTRACT

Aqueous dispersions useful in adhesive and coating applications, and a method of preparing the same. The dispersion contains (a) an ethylene interpolymer having an acid number of at least 117, a melt flow of at least 50, and comprising from 15 to 24 percent by weight of the interpolymer of interpolymerized ethylenically unsaturated carboxylic acid, such as acrylic or methacrylic acid, (b) from about 5 to about 2,000 parts by weight per 100 parts of the interpolymer of a rosin tackifier having an acid number of at least about 76 and being compatible and codispersible with the interpolymer, (c) water in an amount sufficient to provide a solids content of the dispersion of from about 10 to about 60 percent, and (d) water soluble alkali in an amount effective to neutralize from 20 to 130 percent of the acid groups in the interpolymer and the tackifier, to disperse at least 99 percent by weight of the interpolymer and the tackifier, and to provide a viscosity of the dispersion which is less than about 1,500 Pa-s. The dispersion is prepared by heating and agitating a mixture of the ingredients sufficiently to disperse at least about 99 weight percent of the interpolymer and the tackifier.

34 Claims, 1 Drawing Figure

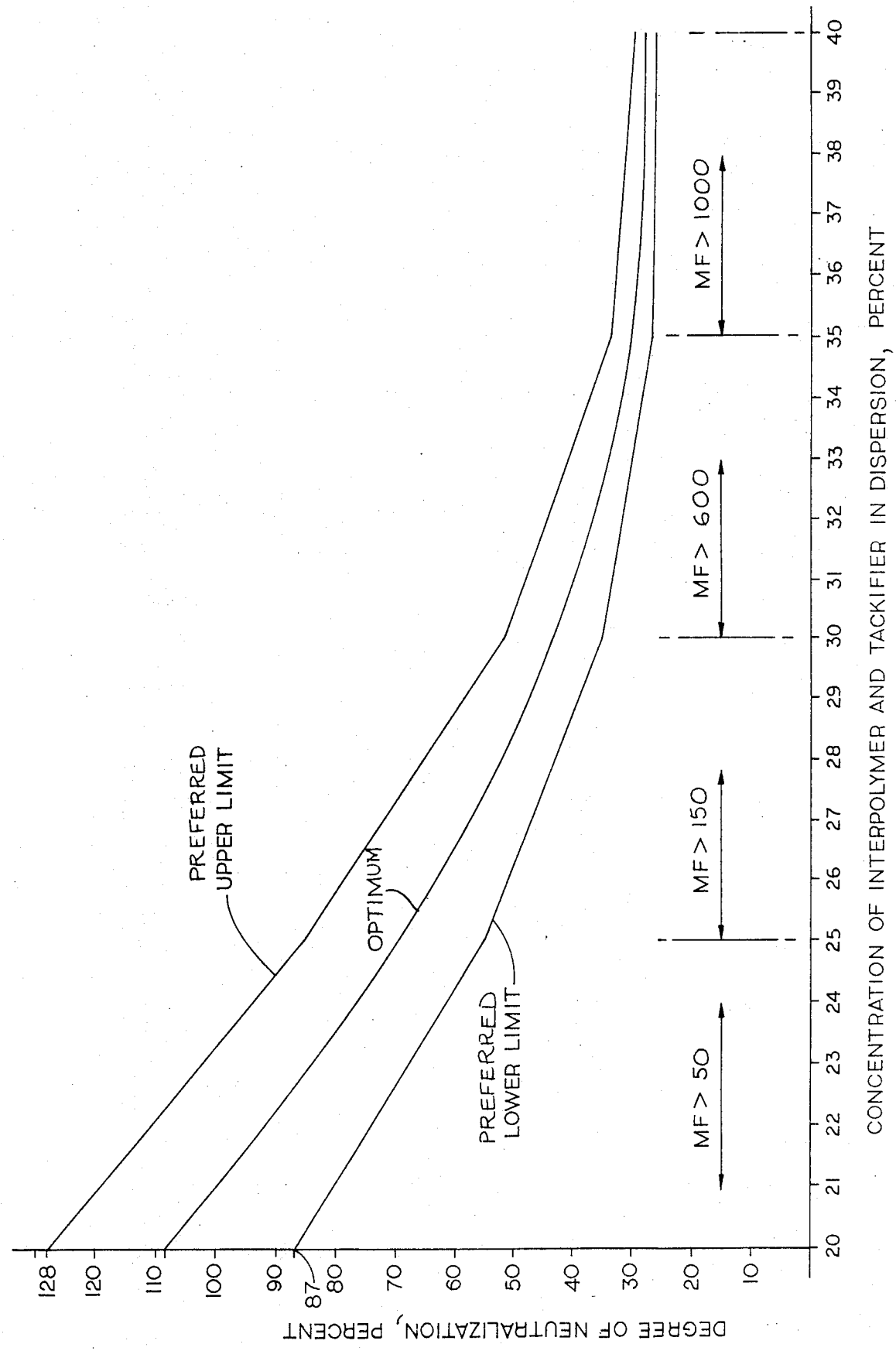

AQUEOUS DISPERSIONS OF ACIDIC ETHYLENE INTERPOLYMERS

FIELD OF THE INVENTION

This invention relates to dilute aqueous alkali dispersions containing (a) interpolymers of ethylene and an ethylenically unsaturated carboxylic acid which have an acid number of at least about 117 and (b) a rosin type tackifier, and a method of preparing the same. More particularly, the invention relates to such dispersions which do not require an organic solvent for their preparation or in their final form, which have a high solids content and low viscosity, which may be substantially free of non-volatile alkali, and yet exhibit utility as adhesives for a wide variety of substrates. Also, the invention relates to a method of preparing such dispersions in which the non-dispersed fraction of the interpolymer and the tackifier is less than 1 percent by weight.

BACKGROUND OF THE INVENTION

The usefulness of polar ethylene interpolymers in coatings and adhesives applications is well known. Often, such polar ethylene interpolymers are employed in conjunction with a tackifier in order to promote adhesion to a wider variety of substrates. Such compositions are commonly employed as hot melt adhesives, or in solvent based systems which set by evaporation of the solvent.

In many instances, especially where a superior bond is desired with a polar substrate, it is desirable to use polymers in which ethylene is interpolymerized with a relatively high proportion of an acidic comonomer. However, the acid content of ethylene interpolymers has generally been limited in systems employing a tackifier because of compatibility problems with the tackifier. For example, in U.S. Pat. No. 3,869,416 there is described a reinforced petroleum wax composition useful as a hot melt adhesive which includes an adhesion promoting system consisting essentially of a polar ethylene interpolymer and a tackifier such as wood rosin or its derivatives. It is disclosed therein that when the polar ethylene interpolymer is ethylene interpolymerized with carboxylic acids, the interpolymerized acid moieties should not exceed 5 mole percent to insure that there is at least partial solubility of the interpolymer in the other ingredients. In addition, the useful ranges of proportions of the interpolymer and tackifier described is extremely limited.

In aqueous adhesive systems containing both a polar ethylene interpolymer and a tackifier, the proportion of acid comonomer in the ethylene interpolymer has also been limited. For example, in U.S. Pat. No. 3,487,036 it was preferred to use ethylene terpolymers containing 0.5–10 percent by weight acrylic acid or methacrylic acid and having a combined vinyl acetate and acid content of 18–40 percent by weight. Similarly, in the dispersion described in U.S. Pat. No. 3,823,108, there was employed an ethylene terpolymer consisting essentially of about 55–80 weight percent ethylene, about 10–42 weight percent ester monomer, and about 3–10 weight percent $\alpha,\beta$-ethylenically unsaturated carboxylic acid. Also, in U.S. Pat. No. 4,289,669, there was described an aqueous dispersion containing an alkenyl succinic anhydride, a tackifier, and an ethylene-acrylic acid or -methacrylic acid interpolymer which had an acid number within a range of about 0.25–30.

The only heretofore known solvent based adhesive system containing both a tackifier and an ethylene interpolymer having interpolymerized therein an ethylenically unsaturated carboxylic acid in a proportion greater than 12 weight percent of which the applicants are aware is described in U.S. Pat. No. 3,853,606. However, this adhesive system is not a true aqueous dispersion, but is instead a solvent-in-water emulsion which is prepared by dispersing an ethylene interpolymer containing 18–24 weight percent of interpolymerized acrylic acid in an aqueous solution of a volatile alkali, the alkali being driven off by heating, and emulsifying into the interpolymer solution a tackifier which has previously been dissolved in an organic solvent. Thus, there are two separate and distinct phases, a continuous aqueous phase containing the ethylene interpolymer, and a dispersed organic solvent phase containing the dissolved tackifier. Such a system is generally disadvantageous because of the handling problems posed by the solvent during preparation and drying of the composition, including, for example, the flammability and/or toxicity of the solvent. Moreover, the dried or set coating resulting from such an adhesive system is characterized as an emulsion of tackifier particles and ethylene interpolymer particles, rather than a homogeneous, single-phase coating. These particles can separate into different phases, especially when exposed to heat.

Other important characteristics of an aqueous based adhesive system are the viscosity and the solids content. Generally, adhesives or coatings solutions with a viscosity greater than about 1500 Pa-s (1500 cp) are not commercially attractive because of the difficulty in applying them to a substrate. While it is desirable to have as high a solids content as is practical because of the reduced time and energy required for drying or setting, it is generally necessary to limit the solids content of the system to obtain a suitable viscosity. While it is possible to heat the adhesive system to reduce the viscosity, this requires specially modified equipment for applying the solution, and is not acceptable with heat-sensitive substrates.

The heretofore known solvent based adhesive systems containing a polar ethylene interpolymer and a tackifier have had serious shortcomings with respect to viscosity and solids content. For example, in U.S. Pat. No. 3,823,108 discussed above, there was reported a viscosity of 3100 Pa-s at only 20 percent solids.

When polymers of ethylene interpolymerized with an ethylenically unsaturated carboxylic acid are employed in an aqueous adhesive system, it is also important to consider the amount and type of alkali required to disperse the interpolymer. For example, in U.S. Pat. No. 3,823,108 there was required an alkali metal hydroxide in an amount sufficient to neutralize 10–100 percent of the acid groups in the ethylene interpolymer and the tackifier, and an amine base in an amount sufficient to neutralize 0–300 percent of the acid groups in the ethylene interpolymer and the tackifier, the total amount of alkali metal hydroxide and amine base being sufficient to neutralize at least about 50 percent of the acid groups. The presence of a strong base such as an alkali metal hydroxide is not desirable because of the corrosion which results to processing equipment and to the substrate. In addition, since such bases are non-volatile and are not removed upon drying, the ethylene interpolymer remains in a cross-linked form which may result in a reduction in adhesion to polar substrates. With the exception of very dilute dispersions, it has not heretofore been known to prepare, without the aid of substantial quantities of a strong alkali or a water-immiscible solvent for the tackifier, a dispersion containing both a highly acidic ethylene interpolymer and a tackifier.

Several methods are known for preparing solvent based adhesive systems containing polar ethylene interpolymers and tackifiers. One type of method involves the use of a water-immiscible solvent to dissolve the tackifier, such as in U.S. Pat. No. 3,853,606, or both the interpolymer and the tackifier, such as in U.S. Pat. No. 3,487,036. In this method, the solvent containing the tackifier and/or interpolymer is emulsified in water or in aqueous interpolymer solution. The resulting emulsion is then used as the adhesive system and applied to a substrate, as in U.S. Pat. No. 3,853,606, or alternatively, the solvent is first evaporated from the emulsion as in U.S. Pat. No. 3,487,036. This type of method is not desirable because of the handling problems concomitant with the use of a solvent other than water.

The other method involves the direct dispersion of the polar ethylene interpolymer and the tackifier into an aqueous medium, as described in U.S. Pat. No. 3,823,108 and U.S. Pat. No. 4,289,669. A major drawback with this type of method has been the low conversion rate of dispersing the interpolymer and tackifier into the aqueous medium. For example, in U.S. Pat. No. 3,823,108 the conversion of the ethylene terpolymer to hydrosol was reported to range from 60–98 percent. Further, the undispersed tackifier and interpolymer must typically be removed by filtration before the dispersion can be used.

SUMMARY OF THE INVENTION

The present invention is an aqueous dispersion which includes (a) an ethylene interpolymer having an acid number of at least about 117, a melt flow of at least 50, and comprising from 15 to 24 percent, by weight of the interpolymer, of interpolymerized ethylenically unsaturated carboxylic acid, (b) from about 5 to about 2000 parts by weight per 100 parts of the interpolymer of a rosin tackifier having an acid number of at least about 76 and a melt flow of at least 50, the tackifier being compatible and codispersible with the interpolymer, (c) water in an amount sufficient to provide a total concentration of the interpolymer and the tackifier of from about 10 to about 60 percent, by weight of the dispersion, and (d) water soluble alkali in an amount effective to obtain a degree of neutralization of from about 20 to about 130 percent, to disperse the interpolymer and tackifier in the water, and to provide a viscosity of the dispersion which is less than about 1500 Pa-s.

The present invention is also a method of preparing an aqueous dispersion, including the steps of (a) mixing: (i) an ethylene interpolymer having an acid number of at least about 117, a melt flow of at least 50, and comprising from 15 to 24 percent, by weight of the interpolymer, of interpolymerized ethylenically unsaturated carboxylic acid, (ii) from about 5 to about 2000 parts by weight per 100 parts of the interpolymer of a rosin tackifier having an acid number of at least about 76 and a melt flow of at least 50, the tackifier being compatible and codispersible with the interpolymer, (iii) water in an amount sufficient to provide a total concentration of the interpolymer and the tackifier of from about 10 to about 60 percent, by weight of the dispersion, and (iv) water soluble alkali in an amount effective to obtain a degree of neutralization of from about 20 to about 130 percent, and to provide a viscosity of the dispersion which is less than about 1500 Pa-s; and (b) heating and agitating the mixture sufficiently to disperse at least about 99 weight percent of the interpolymer and the tackifier, thereby producing an aqueous dispersion of the interpolymer and the tackifier.

BRIEF DESCRIPTION OF THE DRAWING

The FIGURE graphically shows the preferred minimum, preferred maximum and optimum degree of neutralization of the dispersion and the preferred minimum melt flow of the ethylene interpolymer as these properties depend on the solids content of the dispersion between 20 and 40 percent.

DETAILED DESCRIPTION OF THE PREFERRED EMBODIMENTS

The four essential components of the dispersion are an ethylene interpolymer, a rosin tackifier, water, and a water soluble alkali.

The polymers useful in the invention include those obtained by randomly interpolymerizing ethylene with one or more ethylenically unsaturated carboxylic acids. Exemplary of the suitable carboxylic acids are acrylic acid, methacrylic acid, ethacrylic acid, crotonic acid, isocrotonic acid, vinyl acetic acid, maleic acid and fumaric acid, the preferred carboxylic acids being acrylic acid and methacrylic acid, especially acrylic acid. Additionally, the interpolymer may contain relatively minor amounts of additional monomers which are interpolymerizable with ethylene and the carboxylic acid, such as, for example, $\alpha$-olefins such as propylene, 1-butene, 1-pentene, 1-hexene, 1-heptene, 1-octene and the like, alkyl esters of ethylenically unsaturated carboxylic acids such as methyl acrylate, n-butyl acrylate and the like, vinyl monomers and alkenyl esters of carboxylic acids such as vinyl acetate and the like, and other monomers interpolymerizable with ethylene such as carbon monoxide. The proportion of such additional comonomers should be relatively low so that the dipersibility of the ethylene interpolymer is not substantially adversely affected. The interpolymer must be a random interpolymer rather than a block or graft copolymer. Such interpolymers and methods of preparing them are well known.

The acid number, melt flow and carboxylic acid content of the ethylene interpolymers employed in the invention are critical features. The ethylene interpolymer must have an acid number of at least about 117, preferably from 117 to 187, a melt flow of at least 50, preferably from 150 to 10,000, and especially 200–3500, and must contain from 15 to 24 percent, by weight of the interpolymer, preferably from 17 to 22 percent, of interpolymerized ethylenically unsaturated carboxylic acid. If the ethylene interpolymer does not have these properties or proportions, it will not be possible to prepare the dispersion or the resulting dispersion will have an unacceptably high viscosity, low solids content, or low adhesive strength.

As explained below, the melt flow of the ethylene interpolymer is also critical to obtaining a low viscosity, low non-dispersible dispersion and depends on the solids content desired in the dispersion. As shown graphically, in the FIGURE, for a solids content of 25 percent or more, the melt flow of the interpolymer in the dispersion is desirably at least 150; for a solids content of 30 percent or more, the melt flow is desirably at least 600; and for a solids content of 35 percent or more, the melt flow is desirably at least 1000.

As used herein, acid number refers to the milligrams of KOH required to neutralize one gram of the interpolymer or tackifier, and melt flows are determined according to ASTM D-1238 condition E (190° C./2.16 kg).

The second essential component of the invention is a rosin tackifier. As used herein, the term "rosin tackifier" includes both naturally occurring rosins, such as, for example, wood rosin or tall oil rosin, and rosins which have been chemically modified by, for example, addition of maleic anhydride, hydrogenation, dehydrogenation, polymerization or dimerization, esterification with polyhydric or monohydric alcohols, or a combination of these modifications. Such rosin tackifiers and their method of preparation are described in the *Kirk-Othmer Encyclopedia of Chemical Technology*, 2d Ed., Vol. 17, pp. 476–508 (1968). Preferably, a modified rosin is used.

The rosin tackifier must be both compatible with the ethylene interpolymer and codispersible with the ethylene interpolymer. As used herein, by the term "compatible" is meant that a molten mixture consisting substantially only of the tackifier with the interpolymer is not subject to phase separation and does not exhibit a significant increase in viscosity upon being maintained in the molten state for a period of about 24 hours or more. Compatibility of the tackifier with the interpolymer is required both to prepare a stable dispersion and to obtain a dispersion which has utility as an adhesive system.

By the term "codispersible" is meant that a mixture consisting essentially only of the tackifier and interpolymer readily disperse in hot, dilute aqueous alkali.

Many tackifiers other than rosin tackifiers are compatible with highly acidic ethylene interpolymers; however, it has been discovered that not all tackifiers which are compatible with highly acidic ethylene interpolymers are codispersible therewith. Generally, the compatible and codispersible tackifiers are limited to rosin tackifiers which have an acid number of at least about 76, preferably from about 90 to about 170, and a melt flow of at least 50, preferably at least about 150. While many of the rosin tackifiers having an acid number of at least about 76 are suitable for use in the invention, for unknown reasons, many are not. Thus, it is generally necessary to evaluate the suitability of a rosin tackifier, i.e., compatibility and codispersibility, prior to its commercial use in the dispersion. Exemplary of suitable rosin tackifiers are:

Natural wood rosins, grades K, M, N and WG (acid no. 162–163, R&B SP 73° C.);

Tall oil rosins obtained under the trade names SYLVATAC AC (acid no. 178, R&B SP 78° C.; Sylvachem Corp.), SYLVATAC ACF (acid no. 153, R&B SP 78° C.; Sylvachem Corp.), SYLVATAC RX (acid no. 145, R&B SP 75° C.; Sylvachem Corp.), SYLVATAC 95 (acid no. 149–157, R&B SP 95° C.; Sylvachem Corp.), SYLVATAC 115 (acid no. 140, R&B SP 117° C.; Sylvachem Corp.), SYLVATAC 140 (acid no. 130–144, R&B SP 140° C.; Sylvachem Corp.), SYLVATAC 295 (acid no. 158–165, R&B SP 95° C.; Sylvachem Corp.) and SYLVATAC 315 (acid no. 98, R&B SP 58° C.; Sylvachem Corp.);

Hydrogenated rosins obtained under the trade names FORAL AX (acid no. 160, R&B SP 68° C.; Hercules Inc.), STAYBELITE (acid no. 160, R&B SP 75° C.; Hercules Inc.), and STAYBELITE 570 (acid no. 157, R&B SP 76° C.; Hercules Inc.);

Dehydrogenated rosin obtained under the trade name RESIN 731-D (acid no. 154, R&B SP 80° C.; Hercules Inc.);

Polymerized rosins obtained under the trade names DYMEREX (acid no. 139, R&B SP 145° C.; Hercules Inc.), DYMEREX A-700 (acid no. 88, R&B SP 73° C.; Hercules Inc.), DYMEREX 724 (acid no. 168, R&B SP 131° C.; Hercules, Inc.), POLY-PALE (approximately 40% dimer acids, acid no. 144, R&B SP 95° C.; Hercules Inc.), POLY-PALE II (acid no. 145, R&B SP 95° C.; Hercules Inc.); RESIN NC-11 (acid no. 152, R&B SP 82° C.; Hercules, Inc.); and RESIN 861 (acid no. 153, R&B SP 82° C.; Hercules, Inc.); and Rosin esters obtained under the trade names PEXALYN A-500 (pentaerythritol esters diluted with $C_9$ vinyl aromatics, acid no. 98, R&B SP 86° C.; Hercules Inc.) and PEXALYN A-600 (pentaerythritol esters diluted with $C_9$ vinyl aromatics, acid no. 92, R&B SP 104° C.; Hercules Inc.).

The rosin tackifiers may be used in the invention in a wide range of proportions relative to the interpolymer, preferably ranging from about 5 to about 2000, and more especially from about 10 to about 240, parts by weight per 100 parts of the interpolymer.

The third essential component of the dispersion is water in an amount sufficient to provide a solids content of from about 10 to about 60 percent, preferably from about 20 to about 40 percent, by weight of the dispersion. As used herein, by the term "solids content" is meant the total percentage by weight of the interpolymer and the tackifier, based on the total weight of the interpolymer, tackifier and water and soluble alkali in the dispersion.

The fourth essential component of the dispersion is water soluble alkali in an amount effective to obtain a degree of neutralization of from about 20 to about 130 percent and to disperse at least 99 weight percent of the interpolymer and the tackifier in the water. As used herein, the degree of neutralization of the dispersion is the ratio of the base equivalent weights of water soluble alkali to the acid equivalent weights of interpolymer and tackifier, expressed as a percentage unless otherwise indicated. Any water soluble alkali, such as, for example, alkali metal hydroxides such as sodium hydroxide or potassium hydroxide are suitable. Preferably, the alkali is volatile, such as, for example, an amine base such as ethanolamine, diethylamine, morpholine, dimethylaminoethanol, 2-amino-2-methylpropanol, and the like, and more especially, ammonium hydroxide. The volatile alkalis are preferred because they evaporate from the dispersion when it is dried, making the dried coating less corrosive improving water and chemical solvent resistance, and improving adhesive and heat seal strength.

The amount of water soluble alkali in the dispersion should also be effective to provide a viscosity of the dispersion which is less than about 1500 Pa·s, preferably less than about 750 Pa·s. As used herein, viscosity is determined at 25° C. with a no. 2 spindle on a Brookfield LVT viscometer at 60 rpm, unless otherwise indicated. It has been found that for a dispersion of a given solids content, the viscosity depends in large part on the degree of neutralization. To minimize the dispersion viscosity and obtain acceptable dispersibility, it is preferred to have an amount of the alkali present which is effective to obtain a degree of neutralization according to the formulae:

for $20 \leq F \leq 25, [87-6.4(F-20)] \leq A \leq [128-8.6(F-20)]$;

for $25 \leq F \leq 30, [55-4.0(F-25)] \leq A \leq [85-6.6(F-25)]$;
for $30 \leq F \leq 35, [35-1.6(F-30)] \leq A \leq [52-3.6(F-30)]$;
for $35 \leq F \leq 40, 27 \leq A \leq [34-0.8(F-35)]$; and
for $F \geq 40, 27 \leq A \leq 30$;
wherein F is the solids content of the dispersion and A is the degree of neutralization. These formulae are shown graphically in the FIGURE. When a substantial excess of the acid groups are neutralized, there is observed an increase in the dispersion viscosity resulting from ionomeric cross-linking. On the other hand, if insufficient acid groups are neutralized, the interpolymer and tackifier do not adequately disperse. The approximate optimum degree of neutralization depending on the solids content of the dispersion is shown graphically in the FIGURE as the curve lying between the preferred upper and lower limits. This optimum may vary somewhat from that shown, depending on the properties of the interpolymer (particularly melt flow), tackifier and alkali.

As mentioned above, the melt flow of the interpolymer is also important in minimizing the dispersion viscosity. This is because the melt flow is roughly inversely proportional to the molecular weight of the interpolymer, and the viscosity of the dispersion generally increases with the molecular weight of the interpolymer. To minimize the dispersion viscosity, it is preferred to use an ethylene interpolymer with a melt flow according to the following formulae:
for $F \geq 20, MF \geq 50$;
for $F \geq 25, MF \geq 150$;
for $F \geq 30, MF \geq 600$; and
for $F \geq 35, MF \geq 1000$;
wherein F is as defined above and MF is the melt flow of the ethylene interpolymer.

The dispersion may further contain relatively minor amounts of ingredients such as colorants and antioxidants which do not adversely affect the viscosity or stability of the dispersion. The dispersion should not contain more than insubstantial quantities of incompatible or non-codispersible tackifiers or other additives which increase the viscosity or adversely affect the stability of the dispersion.

The method of preparing the dispersion includes the steps of mixing the above-described ethylene interpolymer, rosin tackifier, water and alkali in the proportions described above, and heating and agitating the mixture sufficiently to disperse the interpolymer and the tackifier, thereby producing an aqueous dispersion of the interpolymer and the tackifier. Preferably, at least about 99, and more especially at least about 99.7, weight percent of the interpolymer and the tackifier is dispersed. The relatively insignificant proportion of undispersed interpolymer and tackifier eliminates the need for screening the dispersion to remove the undispersed fraction and permits the use of the dispersion, without any further processing, in conventional solvent based coating applications without any significant plugging of lines or equipment.

The dispersion of the interpolymer and the tackifier is accomplished by relatively mild agitation and moderate heating. According to the method of the present invention, the interpolymer and the tackifier readily disperse into the aqueous medium in a period of time of from about 30 minutes to about 4 hours. Preferably, the dispersion is at a temperature of from bout 80° C. to about 105° C. If a volatile alkali is employed, it is desirable to use a condenser to cool any water or alkali which may be evolved from the mixture during the heating and return the condensate to the dispersion vessel.

It is also preferred to employ in the method of the invention, a volatile alkali as described above. By using only insubstantial quantities of alkali metal hydroxide, the corrosion to the processing equipment is minimized.

The invention is further illustrated by way of the following examples.

COMPATIBILITY AND CODISPERSIBILITY

The compatibility of various commercially available tackifiers with polar ethylene interpolymers was determined by placing an admixture containing 50 weight percent interpolymer and 50 weight percent tackifier in a forced air oven at 177° C. After 1–1.5 hours, the mixtures had melted and were stirred. The samples were then allowed to sit in the oven for a period of about 24 hours. The samples were then examined visually for separation into two or more phases. With a glass stirring rod, the viscosity of the hot mixture was examined visually and physically for any significant increase in viscosity over the sample as originally mixed and stirred after the 1–1.5 hour period. The tackifiers in those mixtures in which phase separation occurred or in which significant thickening was observed were determined to be incompatible.

To demonstrate the effect of an increased acid content in the interpolymer on the compatibility of the interpolymer with commercially available tackifiers, the compatibility of the tackifier with two different ethylene-acrylic acid interpolymers was determined. The first interpolymer, "Interpolymer A," was an ethylene-acrylic acid interpolymer having an acid number of 62, a melt flow of 700 and an acrylic acid content of 8 weight percent. The second interpolymer, "Interpolymer B," was an ethylene-acrylic acid interpolymer having an acid number of 156, a melt flow of 500 and contained 20 weight percent acrylic acid. While many of the tackifiers which were incompatible with interpolymer A were also incompatible with interpolymer B, many of the tackifiers which were compatible with interpolymer A were not compatible with interpolymer B which had a higher acrylic acid content.

The codispersibility of the tackifiers with interpolymer B was determined by cooling and solidifying the melt-blended samples prepared for the compatibility tests and cutting them into pellets or chips. The chips were then placed in a 2-liter reaction vessel equipped with a stirrer and condenser. To the flask was then added water and aqueous ammonium hydroxide in sufficient quantities to provide a 25% solids content and a degree of neutralization of approximately 80 percent. With constant stirring, the contents of the reaction flask were heated to 95°–97° C. and maintained at this temperature until the chips were dispersed or for four hours if substantial quantities remained undispersed. The tackifiers in the samples which contained substantial quantities of visually observable non-dispersibles were determined to be not codispersible.

The results of the aforementioned compatibility and codispersibility testing are presented in Table I.

TABLE I

Compatibility and Codispersibility of Various Commercially Available Tackifiers With Polar Ethylene Interpolymers

| Tackifier/Trade Designation | R & B Softening Point, °C. | Acid No. | Compatibility With Ethylene/Acrylic Acid Inter-polymer A[a] | Inter-polymer B[b] | Codispersibility With Interpolymer B[c] |
|---|---|---|---|---|---|
| Natural Wood Rosin | | | | | |
| K[A] | 73 | 160 | C | C | C |
| M[A] | 73 | 161 | C | C | C |
| N[A] | 73 | 161 | C | C | C |
| WG[A] | 72 | 162 | C | C | C |
| VINSOL[A] | 112 | 95 | N | N | N |
| Tall Oil Rosins | | | | | |
| SYLVATAC AC[B] | 78 | 178 | C | C | C |
| SYLVATAC ACF[B] | 78 | 153 | C | C | C |
| SYLVATAC RX[B] | 75 | 145 | C | C | C |
| SYLVATAC 95[B] | 95 | 154 | C | C | C |
| SYLVATAC 115[B] | 117 | 140 | C | C | C |
| SYLVATAC 140[B] | 140 | 137 | C | C | C |
| SYLVATAC 295[B] | 95 | 161 | C | C | C |
| SYLVATAC 315[B] | 58 | 98 | C | C | C |
| Rosins | | | | | |
| FORAL AX[A] | 68 | 160 | C | C | C |
| STAYBELITE[A] | 75* | 160 | C | C | C |
| STAYBELITE 570[A] | 76* | 157 | C | C | C |
| Dehydrogenated Rosins RESIN 731-D[A] | 80* | 154 | C | C | C |
| Polymerized Rosins | | | | | |
| DYMEREX[A] | 145 | 139 | C | C | C |
| DYMEREX A700[A] | 73 | 88 | C | C | C |
| DYMEREX 724[A] | 131 | 168 | C | C | C |
| POLY-PALE[A] | 95 | 144 | C | C | C |
| POLY-PALE II[A] | 95 | 145 | C | C | C |
| RESIN NC-11[A] | 82 | 153 | C | C | C |
| RESIN 861[A] | 82 | 153 | C | C | C |
| Rosin Esters | | | | | |
| Ester Gum[4,1] | 87 | 6 | N | N | N |
| PENTALYN 344[A,2] | 104 | 10 | C | N | N |
| SYLVATAC 100NS[C] | 99 | 9 | N | N | N |
| ZONESTER 55[D,4] | 52 | 8 | N | N | N |
| ZONESTER 75[D,4] | 78 | 8 | N | N | N |
| ZONESTER 85[D,5] | 82 | 8 | N | N | N |
| ZONESTER 100[D,6] | 94 | 8 | N | N | N |
| Rosin Esters (Diluted) | | | | | |
| PEXALYN A500[4,3] | 86 | 98 | C | C | C |
| PEXALYN A600[4,3] | 104 | 92 | C | C | C |
| Hydrogenated Rosin Esters | | | | | |
| FORAL 85[4,7] | 82* | 9 | C | N | N |
| FORAL 105[4,8] | 104* | 12 | C | N | N |
| HERCOLYN D[A,9] | liquid | 7 | N | N | N |
| HYDROTAC 114[A] | liquid | 7 | C | C | N |
| HYDROTAC 117[A] | liquid | 7 | C | C | N |
| PENTALYN H[4,10] | 104* | 12 | C | N | N |
| STAYBELITE ESTER 5[4,7] | 81* | 5 | C | N | N |
| STAYBELITE ESTER 10[4,7] | 83* | 8 | C | C | N |
| SYLVATAC 80N[A] | 85 | 7 | N | N | N |
| Dibasic Acid Modified Rosin Esters | | | | | |
| CELLOLYN 102[4,12] | 134* | 36 | N | N | N |
| LEWISOL 28[4,13] | 141* | 37 | N | N | N |
| PENTAL 28[A] | 129* | 35 | N | N | N |
| PENTALYN 255[A] | 171* | 190 | N | N | N |
| PENTALYN 261[A] | 171* | 205 | N | N | N |
| PENTALYN 269[A] | 177* | 200 | N | N | N |
| PENTALYN 830[4,14] | 118* | 78 | N | N | N |
| PENTALYN 856[4,12] | 131* | 140 | N | N | N |
| PENTREX 821[A] | 150* | 201 | N | N | N |
| Terpenes (Alpha-Pinene) | | | | | |
| PICCOLYTE A115[A] | 115 | <1 | C | C | N |
| PICCOLYTE A125[A] | 125 | <1 | C | C | N |
| Terpenes (Betz-Pinene) | | | | | |
| PICCOLYTE S115[A] | 115 | <1 | N | N | N |
| PICCOLYTE S125[A] | 125 | <1 | N | N | N |
| ZONAREZ B-85[D] | 85 | <1 | N | N | N |
| ZONAREX M115[D] | 105 | <1 | N | N | N |
| Terpenes (Dipentene) | | | | | |
| PICCOLYTE D-100[A] | 100 | <1 | C | C | N |

TABLE I-continued
Compatibility and Codispersibility of Various Commercially Available Tackifiers With Polar Ethylene Interpolymers

| Tackifier/Trade Designation | R & B Softening Point, °C. | Acid No. | Compatibility With Ethylene/Acrylic Acid Interpolymer A[a] | Compatibility With Ethylene/Acrylic Acid Interpolymer B[b] | Codispersibility With Interpolymer B[c] |
|---|---|---|---|---|---|
| ZONAREZ 7085[D] | 85 | <1 | C | N | N |
| ZONAREZ 7100[D] | 100 | <1 | C | N | N |
| ZONAREZ 7115[D] | 115 | <1 | C | N | N |
| ZONAREZ 7125[D] | 125 | <1 | C | N | N |
| Aromatic Hydrocarbons (Phenolic modified) | | | | | |
| NEVILLAC Hard[B] | 95 | (170)+ | N | N | N |
| NEVILLAC Soft[B] | 61 | (174)+ | N | N | N |
| NEVILLAC Special[B] | 95 | (113)+ | N | N | N |
| NEVILLAC TS[B] | liquid | (235)+ | N | N | N |
| Coumarone-Indenes | | | | | |
| CUMAR LX-50[B] | 100 | <1 | N | N | N |
| CUMAR P-25[B] | 25 | <1 | C | N | N |
| CUMAR R-16[B] | 103 | <1 | N | N | N |
| CUMAR MH-2½[B] | 100 | <1 | N | N | N |
| Aromatic Esters | | | | | |
| TERATE 101[A] | 40* | 50 | N | N | N |
| TERATE 131[A] | 90* | 80 | C | C | N |
| Aliphatic Hydrocarbon Resins | | | | | |
| ESCOREZ 1304[F] | 100 | <1 | C | N | N |
| ESCOREZ 1310[F] | 94 | <1 | C | N | N |
| ESCOREZ 2101[F] | 93 | <1 | C | N | N |
| LX-1035[B] | 170 | <1 | N | N | N |
| PICCOTAC A-BHT[A] | 118 | <1 | N | N | N |
| PICCOTAC B-BHT[A] | 100 | <1 | N | N | N |
| PICCOTAC 95-BHT[A] | 95 | <1 | C | N | N |
| RES D44[A] | 18 | <1 | C | N | N |
| RES D 45[A] | 33 | <1 | C | N | N |
| RES D150[A] | 65 | <1 | C | N | N |
| RES D151[A] | 78 | <1 | C | N | N |

Notes for Table I:
[1]Glycerol ester.
[2]Pentaerythritol ester.
[3]Rosin ester diluted with C9 vinylaromatics.
[4]Glycerol ester of disproportionated tall oil rosin.
[5]Glycerol ester of tall oil rosin.
[6]Pentaerythritol ester of tall oil rosin.
[7]Glycerol ester of hydrogenated rosin.
[8]Pentaerythritol ester of hydrogenated rosin.
[9]Hydrogenated methyl ester of rosin.
[10]Pentaerythritol ester of partially hydrogenated rosin.
[11]Phthalate ester of technical hydroabietyl alcohol.
[N]Pentaerythritol ester of dibasic acid modified rosin.
[13]Maleic modified glycerol ester of rosin.
[14]Pentaerythritol ester of modified maleated rosin.
[A]Hercules Incorporated.
[B]Neville Chemical Co.
[C]Sylvachem Corp.
[D]Arizona Chemical Co.
[E]Goodyear Tire and Rubber Co.
[F]Exxon Chemical Co., U.S.A.
*Hercules drop method.
+Hydroxyl number.
[a]92 wt. % ethylene, 8 wt. % acrylic acid, melt flow 700; N = incompatible, C = compatible.
[b]20 wt. % acrylic acid, melt flow 500, obtained from The Dow Chemical company under the trademark PRIMACOR ADHESIVE POLYMER 5983; N = incompatible, C = compatible.
[c]Codispersibility of 50—50 wt. % mixture of Interpolymer B (see note b) and specified tackifier in sufficient water and ammonia for 25% solids and 80% degree of neutralization; N = not codispersible, C = codispersible.

General Adhesion Tests

Dispersions were prepared according to the invention which had a 25% solids content and contained 100 parts ethylene-acrylic acid interpolymer, acid number 156, 20 weight percent acrylic acid, melt flow 300, and 42.9 parts of a comaptible and codispersible tackifier. The dispersions were evaluated for improved adhesion when bonding various substrates by general adhesion testing. The dispersion was applied to opposing surfaces of two substrate specimens. The specimens were then heat sealed at 121° C. with a 0.7 Kg/cm² (10 psig) bar pressure with a 5 second dwell. The tackifiers lending themselves to improved adhesion of the polar ethylene interpolymer dispersion system were noted and are listed in Table II by substrate.

TABLE II
Recommended Tackifiers for Improved Adhesion

| Substrate | Recommended Tackifiers |
|---|---|
| Aluminum | FORAL AX |
| | Wood Rosins (K, M, N, WG) |
| | POLY-PALE |
| | RESIN NC-11 |
| | RESIN 731-D |
| | STAYBELITE 570 |
| Polyacrylonitrile (Obtained under the | Wood Rosins (K, M, N, WG) |
| | RESIN NC-11 |

TABLE II-continued

Recommended Tackifiers for Improved Adhesion

| Substrate | Recommended Tackifiers |
|---|---|
| designation BAREX) | RESIN 731-D |
| Cellophane | Wood Rosins (K, M, N, WG) |
|  | RESIN NC-11 |
|  | RESIN 731-D |
| Low Density Polyethylene | FORAL AX |
|  | PEXALYN A-500 |
|  | PEXALYN A-600 |
|  | Wood Rosins (K, M, N, WG) |
|  | POLY-PALE |
|  | RESIN NC-11 |
|  | ROSIN 731-D |
|  | STAYBELITE |
|  | STAYBELITE 570 |
| Nylon | FORAL AX |
|  | ROSIN 731-D |
|  | STAYBELITE 570 |
| Polyester | Wood Rosins (K, M, N, WG) |
| Polypropylene | FORAL AX |
|  | RESIN NC-11 |
|  | ROSIN 731-D |
|  | STAYBELITE |
|  | STAYBELITE 570 |
| Polyvinylidene Chloride | FORAL AX |
|  | Wood Rosins (K, M, N, WG) |
|  | POLY-PALE |
|  | ROSIN 731-D |

Adhesive Properties

Quantitative adhesion improvement of 25 percent solid dispersions made from 175 parts ehtylene-acrylic acid resin, acid number 156, 20 weight percent acrylic acid, melt value 300, and 75 parts tackifier was deonstrated by coating a substrate with a 0.38 mm (1.5 mils) coating and heat sealing the substrates at 121° C. with a 0.7 Kg/cm² (10 psig) bar pressure with a 5 second dwell. The results presented in Table III demonstrate the improved adhesive properties of the dispersions containing FORAL AX or STABELITE 570 in comparison to dispersions made only with the ethylene-acrylic acid interpolymer.

TABLE III

Adhesive Properties of the Dispersions

| Substrate | Heat Seal Strength (Kg/cm of width)[1] | | |
|---|---|---|---|
|  | No Tackifier[2] | FORAL AX[3] | STAYBELITE 570[4] |
| Aluminum | 2.9 | — | 4.4 |
| Cellophane | 0.0 | 0.3 | — |
| Low Density Polyethylene | 0.2 | 0.8 | — |
| Polyester | 0.0 | — | 0.7 |

TABLE III-continued

Adhesive Properties of the Dispersions

| Substrate | Heat Seal Strength (Kg/cm of width)[1] | | |
|---|---|---|---|
|  | No Tackifier[2] | FORAL AX[3] | STAYBELITE 570[4] |
| Polyvinylidene Chloride | 0.1 | 0.5 | — |

Notes:
[1] Coating thickness of 0.38 mm (1.5 mils) heat sealed at 121° C. (300° F.) with 0.7 Kg/cm² (10 psig) bar pressure for a 5 second dwell.
[2] Dispersion of 250 g ethylene-acrylic acid interpolymer (20 wt. % acrylic acid, acid no. 156, melt flow 300), 740.5 g water, 9.5 g HN₃.
[3] Dispersion of 75 g FORAL AX, 175 g interpolymer in note 2, 740.5 g water, 9.5 g NH₃.
[4] Dispersion of 75 g STAYBELITE 570, 175 g interpolymer in note 2, 740.5 g water, 9.5 g NH₃.

Viscosity of the Dispersions

The improved viscosity of the dispersions prepared according to the invention was demonstrated by comparing dispersions containing a tackifier with a dispersion containing only an ehtylene interpolymer. The composition and viscosity of the dispersions is presented in Table IV. Note that the viscosity of the dispersions containing DYMEREX or FORAL AX was substantially reduced in comparison to a dispersion containing only the ethylene interpolymer.

TABLE IV

Dispersion Viscosity

| Dispersion | Dispersion Composition | | | | | Viscosity (Pa-S at 23° C.) |
|---|---|---|---|---|---|---|
|  | Interpolymer[1] (g) | DYMEREX (g) | FORAL AX (g) | Water (g) | NH₃ (g) |  |
| 1 | 250 | — | — | 740.5 | 9.5 | 169 |
| 2 | 175 | 75 | — | 740.5 | 9.5 | 128 |
| 3 | 175 | — | 75 | 740.5 | 9.5 | 78 |

Notes:
[1] Ethylene-acrylic acid interpolymer, 20 wt. % acrylic acid, acid no. 156, melt flow 300.

Non-dispersibles

The low non-dispersible fraction of the ethylene interpolymer and tackifier was demonstrated by the foregoing exemplary dispersions. The non-dispersible fraction was determined by passing the dispersion at room temperature through a 100 mesh screen. The non-dispersible fraction is the amount of material retained on the 100 mesh screen, expressed as a percentage of total solids (interpolymer and tackifier). For 25 wt. % solids, the exemplary dispersions of this invention contained less than 0.3 wt. % non-dispersibles, frequently less than 0.08 wt. %. For 40 wt. % total solids, the dispersion contains less than 1 wt. % non-dispersibles, frequently less than 0.3 wt. %.

Exemplary Calculation

In preparing the dispersions of this invention, the following exemplary calculations are made to determine the proper proportions of ingredients. For the purpose of this example, the ethylene interpolymer contains 20 wt. % acrylic acid and has an acid number of 156 and a melt flow of 300; the tackifier is FORAL AX, acid number 160; the dispersion is to contain 25 percent solids; the base is 28 wt. % aqueous ammonia; and the dispersion is to be prepared with 175 g interpolymer and 75 g of the tackifier.

The g mole-equivalents on the acid side are then as follows:

$$\text{gmol-eq (acid side)} = \frac{[(175 \text{ g interpolymer})(156 \text{ g KOH/g})] + [(75 \text{ g tackifier})(160 \text{ mg KOH/g})]}{(1000 \text{ mg/g})(56.1 \text{ g-mol KOH/g KOH})}$$

$$= 0.701 \text{ gmol-eq acid}$$

For 25 wt. % solids, the degree of neutralization is selected to lie between the lower and upper limits (see the FIGURE):
A (lower limit) = 87−6.4(25−20) = 55
A (upper limit) = 128−8.6(25−20) = 85

For the purpose of this example, a degree of neutralization of 80 percent is selected. Then, the gmol-equivalents of base should be:

$$\text{gmol-eq (base side)} = (A/100)(\text{gmol-eq acid side})$$

$$= (80/100)(0.701)$$

$$= 0.561 \text{ gmol} - \text{eq base}$$

The amount of 28 wt. % aqueous ammonia required to obtain the desired degree of neutralization is:

$$g (28 \text{ wt. \% aq. NH}_3) = \frac{(0.561 \text{ mol-eq})(17 \text{ g NH}_3/\text{gmol-eq})}{(0.28 \text{ g NH}_3/\text{g aq NH}_3)}$$

$$= 34.1$$

For a 25 percent solids dispersion, the total batch weight is:

$$\text{Batch Weight} = \frac{175 \text{ g interpolymer} + 75 \text{ g tackifier}}{0.25} = 1000 \text{ g}$$

Then, the amount of additional water required is:

$$g (H_2O) = 1000 \text{ g} - (175 \text{ g interpolymer}) - (75 \text{ g tackifier})$$

$$- (34.1 \text{ g aq NH}_3)$$

$$= 715.9 \text{ g}$$

Thus, the properties of ingredients for this exemplary dispersion are as follows:

| Component | Amount (g) |
|---|---|
| Ethylene interpolymer | 175 |
| Tackifier | 75 |
| 28 wt. % Aq NH₃ | 34.1 |
| NH₃ | (9.5) |
| Water | (24.6) |
| Additional water | 715.9 |
| Total | 1000 |

Similar calculations are employed in predetermining the proportions of ingredients in other dispersions prepared according to the invention.

While the dispersion and its method of preparation are described above, many other variations will occur to those skilled in the art. It is intended that all such variations which fall within the scope and spirit of the appended claims be embraced thereby.

We claim:

1. An aqueous dispersion, consisting essentially of:
    (a) an ethylene interpolymer having an acid number of at least about 117, a melt flow of at least about 50, and comprising from 15 to 24 percent, by weight of said interpolymer, of interpolymerized ethylenically unsaturated carboxylic acid;
    (b) from about 5 to about 2000 parts by weight per 100 parts of said interpolymer of a rosin tackifier having an acid number of at least about 76 and a melt flow of at least 50, said tackifier being compatible and codispersible with said interpolymer;
    (c) water in an amount sufficient to provide a solids content of the dispersion of from about 10 to about 60 percent; and
    (d) water soluble alkali in an amount effective to obtain a degree of neutralization of from about 20 to about 130 percent, to disperse at least 99 weight percent of said interpolymer and said tackifier, and to provide a viscosity of the dispersion which is less than about 1500 Pa-s.

2. The dispersion of claim 1, wherein said interpolymer has a melt flow of from 150 to about 10,000.

3. The dispersion of claim 1, wherein said interpolymer has an acid number from about 117 to about 176 and comprises from 17 to 22 percent, by weight of said interpolymer, of said ethylenically unsaturated carboxylic acid.

4. The dispersion of claim 1, wherein said ethylenically unsaturated carboxylic acid is selected from the group consisting of: acrylic acid, methacrylic acid, ethacrylic acid, crotonic acid, isocrotonic acid, vinyl acetic acid, maleic acid, fumaric acid and combinations thereof.

5. The dispersion of claim 1, wherein said tackifier is present in an amount of from about 10 to about 240 parts by weight per 100 parts of said interpolymer.

6. The dispersion of claim 1, wherein said tackifier has an acid number of from about 90 to about 170.

7. The dispersion of claim 1, wherein at least 90 percent of said water soluble alkali is volatile alkali.

8. The dispersion of claim 1, wherein said melt flow of said interpolymer depends on said solids content according to the formulae:
    for $F \geq 20, MF > 50$;
    for $F \geq 25, MF > 150$;
    for $F \geq 30, MF > 600$; and
    for $F \geq 35, MF > 1000$;
wherein F is the solids content of the dispersion in percent and MF is the melt flow of the ethylene interpolymer.

9. The dispersion of claim 8, wherein said alkali is present in an amount effective to obtain a degree of neutralization according to the formulae:
    for $20 \leq F \leq 25, (87-6.4(F-20)) \leq A \leq (128-8.6(F-20))$;
    for $25 \leq F \leq 30, (55-4.0(F-25)) \leq A \leq (85-6.6(F-25))$;
    for $30 \leq F \leq 35, (35-1.6(F-30)) \leq A \leq (52-3.6(F-30))$;
    for $35 \leq F \leq 40, 27 \leq A \leq (34-0.8(F-35))$; and
    for $F \geq 40, 27 \leq A \leq 30$;
wherein F is the solids content of the dispersion in percent and A is the degree of neutralization in percent.

10. The dispersion of claim 1, wherein said viscosity is less than about 750 Pa-s.

11. An aqueous dispersion, consisting essentially of:
    (a) an ethylene interpolymer having a melt flow of from 150 to 10,000, an acid number from about 117 to about 176, and comprising from 17 to 22 percent, by weight of said interpolymer, of an interpolymerized ethylencially unsaturated carboxylic acid selected from the group consisting of: acrylic acid, methacrylic acid, ethacrylic acid, crotonic acid, isocrotonic acid, vinyl acetic acid, maleic acid, fumaric acid and combinations thereof;
(b) from about 5 to about 2000 parts by weight per 100 parts of said interpolymer of a rosin tackifier having an acid number from about 90 to about 170, said tackifier being compatible and codispersible with said interpolymer;
(c) water in an amount sufficient to provide a solids content of the dispersion of from about 20 to about 40 percent; and
(d) a volatile water soluble alkali in an amount effective to obtain a degree of neutralization according to the formulae:

for $20 \leq F \leq 25, (87-6.4(F-20)) \leq A \leq (128-8.6(F-20))$;
for $25 \leq F \leq 30, (55-4.0(F-25)) \leq A \leq (85-6.6(F-25))$;
for $30 \leq F \leq 35, (35-1.6(F-30)) \leq A \leq (52-3.6(F-30))$; and
for $35 \leq F \leq 40, 27 \leq A \leq (34-0.8(F-35))$;

wherein F is the solids content of the dispersion in percent and A is the degree of neutralization in percent, said amount of said alkali being effective to provide a dispersion having a viscosity less than about 1500 Pa-s.

12. The dispersion of claim 11, wherein said ethylenically unsaturated carboxylic acid is acrylic acid.

13. The dispersion of claim 11, wherein said ethylenically unsaturated carboxylic acid is methacrylic acid.

14. The dispersion of claim 11, wherein said interpolymer has a melt flow of from 200 to 3500.

15. The dispersion of claim 11, wherein said melt flow of said interpolymer depends on said solids content according to the formulae:
for $F \geq 25, MF > 150$;
for $F \geq 30, MF > 600$; and
for $F \geq 35, MF > 1000$;
wherein MF is the melt flow of the interpolymer.

16. The dispersion of claim 11, wherein said tackifier is present in an amount of from about 10 to about 240 parts by weight per 100 parts of said interpolymer.

17. The dispersion of claim 11, wherein said alkali is ammonium hydroxide.

18. The dispersion of claim 11, wherein said viscosity is less than about 750 Pa-s.

19. The dispersion of claim 11, wherein said tackifier has a melt flow of at least about 500.

20. An aqueous dispersion, comprising:
(a) an ethylene interpolymer having a melt flow of from 200 to 3500, an acid number from about 117 to about 176, and comprising from 17 to 22 percent, by weight of said interpolymer, of interpolymerized acid selected from acrylic acid and methacrylic acid;
(b) from about 10 to about 240 parts by weight per 100 parts of said interpolymer of a rosin tackifier having an acid number from about 90 to about 170 and a melt flow of at least about 500, said tackifier being compatible and codispersible with said interpolymer;
(c) water in an amount sufficient to provide a solids content of the dispersion of from about 20 to about 40 percent, said melt flow of said interpolymer depending on said solids content according to the formulae:
for $F \geq 25, MF > 150$;
for $F \geq 30, MF > 600$; and
for $F \geq 35, MF > 1000$;
wherein F is the solids content in percent and MF is the melt flow of the interpolymer; and (d) ammonium hydroxide in an amount effective to obtain a degree of neutralization according to the formulae:
for $20 \leq F \leq 25, (87-6.4(F-20)) \leq A \leq (128-8.6(F-20))$;
for $25 \leq F \leq 30, (55-4.0(F-25)) \leq A \leq (85-6.6(F-25))$;
for $30 \leq F \leq 35, (35-1.6(F-30)) \leq A \leq (52-3.6(F-30))$; and
for $35 \leq F \leq 40, 27 \leq A \leq (34-0.8(F-35))$;
wherein A is the degree of neutralization in percent, said amount of said ammonium hydroxide being effective to provide a dispersion having a viscosity less than about 750 Pa-s.

21. A method of preparing an aqueous dispersion, comprising the steps of:
(a) mixing components consisting essentially of:
  (i) an ethylene interpolymer having an acid number of at least about 117, a melt flow of at least about 80, and comprising from 15 to 24 percent, by weight of said interpolymer, of interpolymerized ethylenically unsaturated carboxylic acid;
  (ii) from about 5 to about 2000 parts by weight per 100 parts of said interpolymer of a rosin tackifier having an acid number of at least about 76 and a melt flow of at least 50, said tackifier being compatible and codispersible with said interpolymer;
  (iii) water in an amount sufficient to provide a solids content of the mixture of from about 10 to about 60 percent; and
  (iv) water soluble alkali in an amount effective to obtain a degree of neutralization of from about 20 to about 130 percent; and
(b) heating and agitating said mixture sufficiently to disperse therein at least 99 weight percent of said interpolymer and said tackifier.

22. The method of claim 21, wherein said interpolymer has a melt flow of from 150 to about 10,000.

23. The method of claim 21, wherein said interpolymer has an acid number from about 117 to about 176 and comprises from 17 to 22 percent, by weight of said interpolymer, of said ethylenically unsaturated carboxylic acid.

24. The method of claim 21, wherein said ethylenically unsaturated carboxylic acid is selected from the group consisting of: acrylic acid, methacrylic acid, ethacrylic acid, crotonic acid, isocrotonic acid, vinyl acetic acid, maleic acid, fumaric acid and combinations thereof.

25. The method of claim 21, wherein said tackifier is mixed in an amount of from about 10 to about 240 parts by weight per 100 parts of said interpolymer.

26. The method of claim 21, wherein said tackifier has an acid number of from about 90 to about 170.

27. The method of claim 21, wherein at least 90 percent of said water soluble alkali is volatile alkali.

28. The method of claim 21, wherein said melt flow of said interpolymer depends on said solids content according to the formulae:
for $F \geq 20, MF > 50$;
for $F \geq 25, MF > 150$;
for $F \geq 30, MF > 600$; and
for $F \geq 35, MF > 1000$;
wherein F is the solids content of the dispersion in percent and MF is the melt flow of the ethylene interpolymer.

29. The method of claim 28, wherein said alkali is mixed in an amount effective to obtain a degree of neutralization according to the formulae:
for $20 \leq F \leq 25, (87-6.4(F-20)) \leq A \leq (128-8.6(F-20))$;

for $25 \leq F \leq 30, (55-4.0(F-25)) \leq A \leq (85-6.6(F-25))$;
for $30 \leq F \leq 35, (35-1.6(F-30)) \leq A \leq (52-3.6(F-30))$;
for $35 \leq F \leq 40, 27 \leq A \leq (34-0.8(F-35))$; and
for $F \leq 40, 27 \leq A \leq 30$; wherein F is the solids content of the mixture in percent and A is the degree of neutralization in percent.

30. The method of claim 21, wherein said viscosity is less than about 750 Pa-s.

31. The method of claim 21, wherein said heating is at a temperature of from about 80° C. to about 105° C.

32. The method of claim 21, wherein at least about 99.7 weight percent of said interpolymer and said tackifier is dispersed.

33. The method of claim 21, wherein said interpolymer and said tackifier are melt-blended together prior to said mixing with said water and said alkali.

34. A method of preparing an aqueous dispersion, comprising the steps of:
   (a) melt-blending:
      (i) an ethylene interpolymer having a melt flow of from 200 to 3500, an acid number from about 117 to about 176, and comprising from 17 to 22 percent, by weight of said interpolymer, of interpolymerized ethylenically unsaturated carboxylic acid selected from the group consisting of: acrylic acid, methacrylic acid and combinations thereof; with
      (ii) from about 10 to about 240 parts by weight per 100 parts of said interpolymer of a rosin tackifier having an acid number from about 90 to about 170 and a melt flow of at least 500, said tackifier being compatible and codispersible with said interpolymer;
   (b) mixing:
      (i) said melt blend;
      (ii) water in an amount sufficient to provide a solids content of the mixture of from about 20 to about 40 percent; and
      (iii) ammonium hydroxide in an amount effective to obtain a degree of neutralization according to the formulae:
      for $20 \leq F \leq 25, (87-6.4(F-20)) \leq A \leq (128-8.6(F-20))$;
      for $25 \leq F \leq 30, (55-4.0(F-25)) \leq A \leq (85-6.6(F-25))$;
      for $30 \leq F \leq 35, (35-1.6(F-30)) \leq A \leq (52-3.6(F-30))$; and
      for $35 \leq F \leq 40, 27 \leq A \leq (34-0.8(F-35))$;
      wherein F is the solids content of the dispersion and A is the degree of neutralization in percent, said amount of said ammonium hydroxide being effective to provide a dispersion having a viscosity less than about 750 Pa-s; and
   (c) heating to a temperature of from about 80° C. to about 105° C. and agitating said mixture sufficiently to disperse at least about 99.7 weight percent of said interpolymer and said tackifier, thereby producing an aqueous dispersion of said interpolymer and said tackifier.

* * * * *

UNITED STATES PATENT OFFICE
CERTIFICATE OF CORRECTION

PATENT NO. : 4,714,728

DATED : December 22, 1987

INVENTOR(S) : Stephen L. Graham & David O. Plunkett

It is certified that error appears in the above-identified patent and that said Letters Patent are hereby corrected as shown below:

Col. 4, line 41, "dipersibility" should read --dispersibility--.

Col. 8, line 1, "bout" should read --about--.

Col. 9, Table I, in the first column, the first subheading, "Natural Wood Rosin" should read --Natural Wood Rosins--.

Col. 9, Table I, in the first column the third subheading, "Rosins" should read --Hydrogenated Rosins--.

Col. 11, Table I, under "Notes for Table I", "$^N$Pentaerythritol" should read --$^{12}$Pentaerythritol--.

Col. 11, line 61, "comaptible" should read --compatible--.

Col. 13, line 48, "ehtylene-acrylic" should read --ethylene-acrylic--.

Col. 13, line 50, "deonstrated" should read --demonstrated--.

Col. 14, line 21, "ehtylene" should read --ethylene--.

Col. 15, line 44, "properties" should read --proportions--.

UNITED STATES PATENT AND TRADEMARK OFFICE
CERTIFICATE OF CORRECTION

PATENT NO. : 4,714,728
DATED : December 22, 1987
INVENTOR(S) : Stephen L. Graham & David O. Plunkett It is certified that error appears in the above-identified patent and that said Letters Patent is hereby corrected as shown below:

Col. 19, line 4, "$F \leq 40$" should read --$F \geq 40$,--.

Signed and Sealed this

Eleventh Day of October, 1988

Attest:

DONALD J. QUIGG

Attesting Officer

Commissioner of Patents and Trademarks